US 8,483,562 B2

(12) United States Patent
Wellbrock et al.

(10) Patent No.: US 8,483,562 B2
(45) Date of Patent: Jul. 9, 2013

(54) METHOD AND APPARATUS FOR INTEGRATING AUTOMATED SWITCHING IN A PASSIVE OPTICAL NETWORK

(75) Inventors: Glenn A. Wellbrock, Wylie, TX (US); Tiejun J. Xia, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 737 days.

(21) Appl. No.: 12/616,543

(22) Filed: Nov. 11, 2009

(65) Prior Publication Data

US 2011/0110662 A1 May 12, 2011

(51) Int. Cl.
*H04J 14/00* (2006.01)

(52) U.S. Cl.
USPC .......... 398/71; 398/72; 398/66; 398/68; 398/100; 398/45; 398/48; 398/16; 398/21; 398/33; 398/38; 370/352; 370/392; 370/389; 370/468; 370/228

(58) Field of Classification Search
USPC .......... 398/66, 67, 68, 58, 70, 71, 72, 45, 398/46, 47, 48, 49, 50, 51, 55, 56, 57, 79, 398/98, 99, 100, 10, 13, 16, 20, 21, 33, 53, 398/17, 25, 38; 370/352, 392, 389, 468, 395.31, 370/228, 222, 225, 227
See application file for complete search history.

(56) References Cited

U.S. PATENT DOCUMENTS

| | | | |
|---|---|---|---|
| 6,788,898 B1 * | 9/2004 | Britz et al. ................. 398/70 |
| 7,171,121 B1 * | 1/2007 | Skarica et al. .............. 398/67 |
| 7,715,722 B1 * | 5/2010 | Hoke et al. ................ 398/115 |
| 2002/0048067 A1 * | 4/2002 | Handelman et al. ......... 359/139 |
| 2006/0172775 A1 * | 8/2006 | Conyers et al. ............. 455/561 |
| 2009/0238564 A1 * | 9/2009 | Rohde et al. ................ 398/45 |
| 2011/0129226 A1 * | 6/2011 | Vleugels et al. ............. 398/66 |
| 2012/0039598 A1 * | 2/2012 | Dahlfort .................... 398/13 |

* cited by examiner

*Primary Examiner* — Hanh Phan

(57) ABSTRACT

An approach is provided for integrating one or more fiber switches in a passive optical network. A platform generates a command signal to control a splitter hub of a passive optical network, the splitter hub being configured to communicate with a plurality of optical network terminals that respectively serve a plurality of customer premises. The splitter hub includes a fiber switch configured to provide switching between one of a plurality of input ports and one of a plurality of output ports of the splitter hub.

14 Claims, 9 Drawing Sheets

METHOD AND APPARATUS FOR INTEGRATING AUTOMATED SWITCHING IN A PASSIVE OPTICAL NETWORK

BACKGROUND INFORMATION

Customer need for higher bandwidth has fueled growth of passive optical network, an emerging access network that provides high bandwidth to end users, thus permitting a multitude of service offerings from content delivery to Internet access. Passive networks are deployed to minimize costs, making it practical to provide so-called "fiber to the curb." In a passive optical network, one optical line terminal in a central office serves many optical network terminals at user premises through a passive optical splitter. User optical network terminal is connected to a port of the splitter. Because of the passive nature of the splitters, they cannot provide any switching or buffering capabilities. Therefore, expansion of passive optical networks and growth in number of users of these networks introduce new challenges. Namely, many operations, such as testing, trouble shooting, pro-active maintenance, service connection/disconnection, etc. are provided manually, largely requiring dispatch of field technicians. Manual operations are inefficient, costly, time consuming, and can result in poor quality of service.

Therefore, there is a need for an approach for integrating fiber switches in passive optical networks for remote access and/or automation.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and system for integrating automated switching in a passive optical network are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to an optical networking technology, it is contemplated that these embodiments have applicability to any type of network technology utilized in a passive network.

Figure 1:
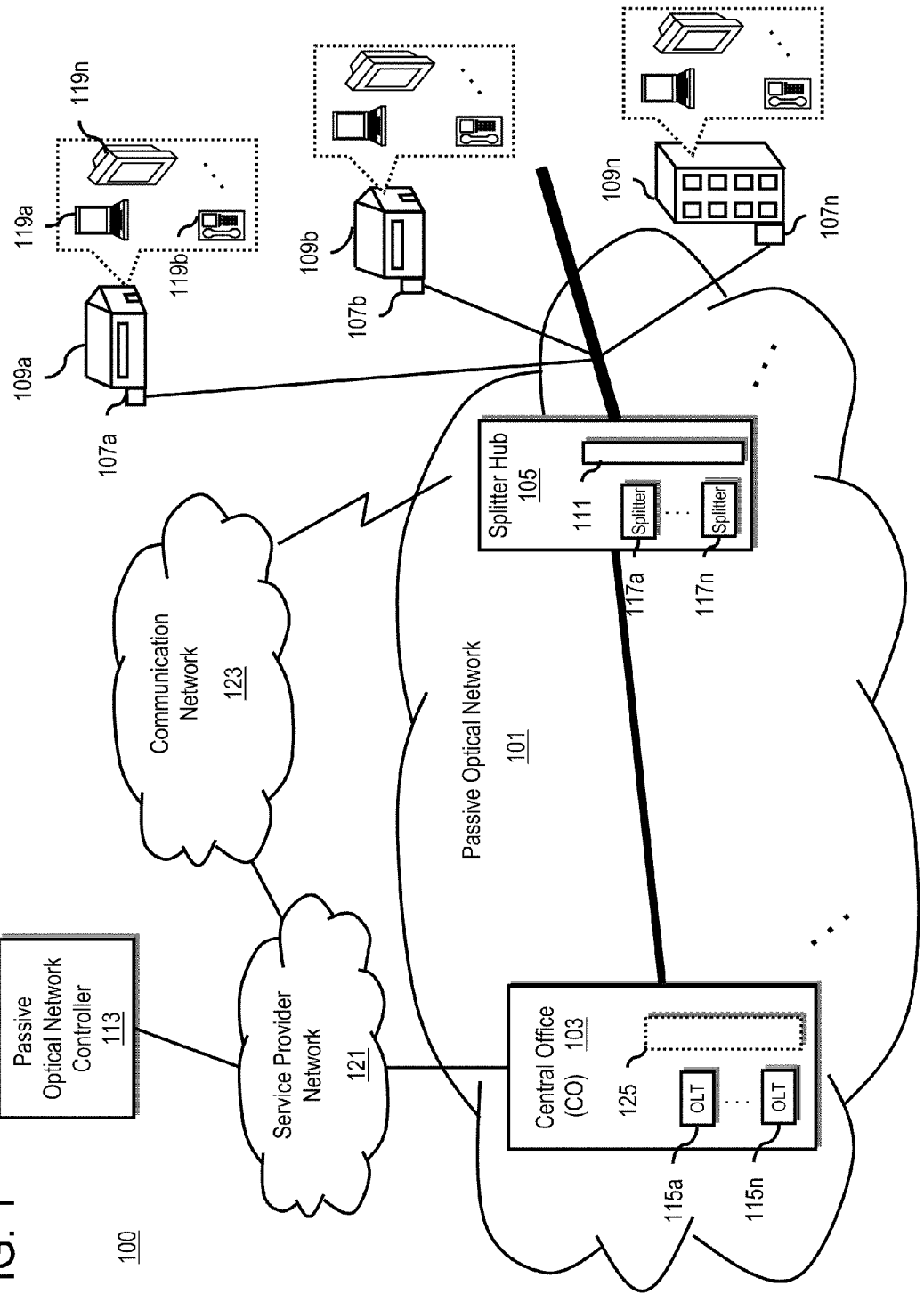
FIG. 1 is a diagram of a system capable of providing automated switching in a passive optical network, according to an exemplary embodiment.

FIG. 1 is a diagram of a system capable of providing automated switching in a passive optical network, according to an exemplary embodiment. As shown, system 100 can implement a variety of services remotely and automatically that previously needed human intervention (e.g., involvement of technicians). System 100 includes a passive optical network 101 that can include one or more central offices (CO) such as central office 103, one or more passive splitter hubs such as passive splitter hub 105, and one or more optical network terminals 107a-107n. In the example of FIG. 1, the passive optical network 101 provides network connectivity to user (or customer) premises 109a-109n. The splitter hub 105 is configured to distribute optical signal received from the central office 103 to the user premises 109a-109n. According to certain embodiments, the splitter hub 105 is integrated with a fiber switch 111 to permit automated switching functionality. This integration is enabled, in part, by the introduction of a standalone power source that can supply power to the active fiber switch 111. Moreover, the splitter hub 105 supports a signaling communication that is independent of the fiber links; in one embodiment, this signaling channel is a wireless link. The passive optical network 101 implementing the splitter hub 105, which includes the fiber switch 111, in combination with passive optical network controller 113 can support a variety of services, e.g., automatic connection/disconnection re-configuration, pro-active fiber link testing, and automatic optical line terminal (OLT) and/or optical network terminal (ONT) trouble shooting, more efficiently and with higher quality of service.

In one embodiment, the passive optical network 101 implements a point to multipoint architecture that employs passive optical splitters to enable an optical fiber to serve multiple premises. For example, the passive optical network 101 includes the central office 103, which includes optical line terminals (OLT) 115a-115n. The optical line terminals 115a-115n transmit optical signals that are destined to one or more user premises 109a-109n. Each of the optical line terminals 115a-115n is connected to one or more passive splitter 117a-117n in the splitter hub 105. The splitter 117a, which is, for example, connected to optical line terminal 115a, is configured to receive an optical signal from the optical line terminal 115a, split the received optical signal to feed user fiber links that are connected to the splitter 117a. The splitters 117a-117n can split signal from a single fiber into multiple fibers (e.g., 4, 8, 16, 32, 64, 128, or etc.). As passive devices, the splitters 117a-117n are unpowered optical splitters that can be located in places such as manholes, under bridges, etc., close to user premises without the constraint of having to be located to near a power source. Because of the passive nature of the splitters, they cannot provide any switching or buffering capabilities.

To address this issue, the fiber switch 111 is integrated between the splitters 117a-117n and user ports and is configured to connect user ports and the ports of splitters 117a-117n. The integration of the switch 111 in the passive splitter hub 105 can provide services to a service provider of the passive optical network 101 and/or users of the network more efficiently, less costly, and with higher service quality by eliminating the need for dispatching technicians, by detecting problems with the network earlier and with greater accuracy, etc.

User fiber links are terminated at the optical network terminals 107a-107n located at the user premises 109a-109n. As an example, the user premise 109a can include a variety of user devices 119a-119n. The user devices 119a-119n are directly or indirectly connected to the optical network terminal 107a. The optical network terminal 107a converts optical signal received from the central office 103, through the splitter hub 105, to electrical signal that serves the user devices 119a-119n. The optical network terminal 107a can support a variety of media and/or communication services, such as POTS (plain old telephone service), internet data, video services, etc. The optical network terminal 107a can also convert electrical signal from the user devices 119a-119n to optical signal to be transmitted to the central office 103. An optical signal that leaves the optical line terminal 115a of the central office 103 is broadcasted to all the user premises that are served by the splitter 117a, which is, for example, connected to the optical line terminal 115a. The optical network terminals located at the user premises are therefore designed to filter out any signal that is not intended for them.

Further, in the upstream path (from the user premises 109a-109n to the central office 103), the optical network terminals 107a-107n employ a multiplexing scheme to avoid any collision between signals transmitted from each of the user premises. For instance, the optical network terminals 107a-107n can transmit their signals using a unique wavelength by applying a wavelength-division multiplexing scheme. Alternatively or additionally, one or more of the optical network terminals 107a-107n can transmit their signals using other multiplexing schemes, e.g., time-division multiplexing.

In the example of FIG. 1, the passive optical network 101 can be part of and/or be in communication with a service provider network 121. For instance, the service provider network 121 can include and/or be connected to the central office 103. The service provider network 121 may include one or more networks such as a data network and/or a telephony network. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. Moreover, the telephony network can be provided via a combination of circuit-switched technologies or a packetized voice infrastructure.

For the purpose of illustration, the service provider network 121 can interface with another communication network 123, which can include a radio network that supports a number of wireless terminals, which may be fixed or mobile, using various radio access technologies. According to one exemplary embodiment, radio technologies that can be contemplated include: first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), 4G, etc. For instance, various mobile communication standards have been introduced, such as first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), and beyond 3G technologies (e.g., third generation partnership project (3GPP) long term evolution (3GPP LTE), 3GPP2 universal mobile broadband (3GPP2 UMB), etc.).

Complementing the evolution in mobile communication standards adoption, other radio access technologies have also been developed by various professional bodies, such as the Institute of Electrical and Electronic Engineers (IEEE), for the support of various applications, services, and deployment scenarios. For example, the IEEE 802.11 standard, also known as wireless fidelity (WiFi), has been introduced for wireless local area networking, while the IEEE 802.16 standard, also known as worldwide interoperability for microwave access (WiMAX) has been introduced for the provision of wireless communications on point-to-point links, as well as for full mobile access over longer distances. Other examples include Bluetooth, ultra-wideband (UWB), the IEEE 802.22 standard, etc.

In the exemplary embodiment of FIG. 1, the passive optical network controller 113 is configured to control one or more fiber switches, such as the fiber switch 111, integrated in the splitter hub 105. In one example, the passive optical network controller 113 resides in the central office 103. Additionally or alternatively, the passive optical network controller 113 can be located away from the central office 103 and be in communication with the central office 103 through the service provider network 121.

As noted, the fiber switch 111 is integrated in the passive splitter hub 105 and resides between the passive splitters 117a-117n and user ports. Since the splitter hub 105 is unpowered and its communication with outside of the hub is through fiber optics, the fiber switch 111 is implemented using alternative power sources and alternative communication techniques. In one exemplary embodiment, the fiber switch 111 includes one or more optical switches (not shown) that enable signals in optical fibers or integrated optical circuits to be selectively switched from one fiber or circuit to another fiber or circuit. The optical switches can be configured as N×N, 1×N, and/or N×M ports, which N and M are positive integer numbers (e.g., between 32 and 300). According to one implementation of the embodiment of system 100, the optical switch consumes very low electric power and power is only needed during the switching. No extra power is needed to maintain the switched link.

To retain the flexibility in deployment of a passive distribution system, the fiber switch 111 of the splitter hub 105 can include and/or be connected to alternative sources of power such as solar cells or panels (not shown) to convert light energy (photons) to electricity. The power produced by the solar cells can be supplied to the fiber switch 111 of the splitter hub 105 as well as to charge one or more batteries (not shown) integrated in and/or coupled to the fiber switch 111. It is noted that the size and number of solar cells depend on the technology and power required for the optical switch 111.

Further, the fiber switch 111 can be connected to and/or include a communication device (not shown) configured to communicate, directly or indirectly, with the passive optical network controller 113. As noted, the passive optical network controller 113 is capable of controlling the fiber switch 111 to perform a variety of services. Communication between the passive optical network controller 113 and the fiber switch 111 is performed by the communication device integrated in communication with the fiber switch 111. In one example, the communication device can include a wireless communication device and the fiber switch 111 can communicate with the passive optical network controller 113 through communication network 123. In another example, control signals generated by the passive optical network controller 113 can be communicated to the fiber switch 111 using an optical signal on an optical fiber through the passive optical network. In this example, the communication device can include an optical network terminal to convert the control signal, which is modulated in an optical signal, to electrical signal to control the optical switch. It is contemplated that other communication devices can be integrated in the fiber switch 111 to perform necessary communication with the passive optical network controller 113.

In one embodiment, passive splitters such as splitters 117a-117n are located close to user premises. Because of their location, the passive splitters are often faced with harsh environmental conditions. Therefore, different elements of the fiber switch 111, such as the optical switch, the power source, the communication device, etc. are designed and implemented to be environmentally stable. For example, the fiber switch 111 can tolerate extreme weather conditions such as temperature, humidity, etc.

Advantageously, integration of one or more fiber switches, such as the fiber switch 111, in the passive optical network 101, as illustrated in system 100, can provide a variety of services more efficiently, less costly, with greater accuracy and higher quality of service by, for example, reducing the need to dispatch technicians, detecting possible problems with the network early on, performing services automatically and remotely, etc.

In one embodiment, the passive optical network controller 113 in communication with the fiber switch 111 integrated in the passive splitter hub 105 can perform connection and/or disconnection reconfiguration remotely and automatically, without technician involvement. For example, if an existing customer associated with, for example, the user premises 109a requests cancellation of service, the fiber link connecting, for example, the splitter 117a, which serves the customer, to the customer optical network terminal 107a should be disconnected from the splitter 117a. In this example, the passive optical network controller 113 receives an indication associated with the customer's request for cancellation and generates a command signal to be communicated to the fiber switch 111 to disconnect the customer's port from the splitter's port, therefore, discontinuing the customer's service.

Moreover, a user, who is not a subscriber of the service provider, can request for service over the passive optical network 101. The passive optical network controller 113 can receive an indication regarding the connection request of the user. In response, the passive optical network controller 113 generates a command signal to the fiber switch 111 to connect a user port associated with the user requesting the service to a splitter of the splitter hub 105.

Furthermore, implementing one or more fiber switches in the passive optical network 101 can provide capability for remote and automatic trouble shooting of the optical line terminals 115a-115n. In this exemplary embodiment, an optional fiber switch 125 can be integrated in the central office 103 between the optical line terminals 115a-115n and outside plant fiber cable. The fiber switch 125 integrated in the central office connects the optical line terminals to the fiber links connected to the splitters of the splitter hub 105. The passive optical network controller 113 can receive an indication, for example from the central office 103, that one of the optical line terminals 115a-115n is experiencing some problem. Based on the received indication and information, the passive optical network controller 113 generates a command signal to be communicated to the fiber switch 125 of the central office 103 to switch from the troubled optical line terminal to a backup optical line terminal to minimize any service disruption to customers. Further, the passive optical network controller 113 can generate a service request regarding the troubled optical line terminal.

In another embodiment, the passive optical network controller 113 along with one or more fiber switches integrated in the passive optical network 101 can be used for automatic and remote trouble shooting of a splitter in the splitter hub 105. In this embodiment, in addition to the fiber switch 111, a second fiber switch (not shown) can be used between input fiber cables to the splitter hub 105 and the passive splitters 117a-117n. If the passive optical network controller 113 receives an indication that a passive splitter is experiencing problems, it can generate a command signal, to be communicated to the fiber switch integrated in the splitter hub 105 between the input fiber cables and the splitters, to switch the input fiber cable associated with the troubled splitter from the troubled splitter to a backup splitter. Further, the passive optical network controller 113 can generate another command signal to the fiber switch 111 to connect the user ports, which are connected to the troubled splitter, to the backup splitter. The passive optical network controller 113 can further generate a service request for examination and (if needed) service for the troubled splitter.

Additionally, integrating one or more fiber switches in the passive optical network 101 can provide pro-active fiber link maintenance. In this example, the passive optical network controller 113 receives an indication that a user is not using service on the network. For instance, the passive optical network controller 113 can receive the indication from the central office 103. The passive optical network controller 113 can initiate a test of the fiber link associated with the user. The fiber link can include a link between the user's optical network terminal and the splitter associated with the user, a link between the central office and the splitter associated with the user, the splitter associated with the user, and/or any combination thereof. The central office 103 can include a test device (not shown) configured to perform necessary tests. In one embodiment, the passive optical network controller 113 can generate a command signal to the fiber switch 125 integrated in the central office to connect the test device to a test port connected to the splitter associated with the user. Further, the passive optical network controller 113 can generate another command signal to be communicated to the fiber switch 111 of the splitter hub 105. The fiber switch 111, based on the command signal, can connect the drop port of the user to the test port of the splitter associated with the user.

The passive optical network controller 113 generates a request to be communicated to the test device to initiate the test. Results of the test can be communicated back to the passive optical network controller 113 and a service request can be generated if problems with the link are detected.

As another example, remote and automatic trouble shooting of optical network terminals 107a-107n, at user premises, can be provided by integrating one or more fiber switches in the passive optical network 101. In this exemplary embodiment, the passive optical network controller 113 can receive an indication that a user optical network terminal is not operating properly. In response, the passive optical network controller 113 generates a request to initiate a test of the user link. The user link test can be performed as expressed before. Based on the results of the test, the passive optical network controller 113 can decide if the problem is with the user optical network terminal or the user link. If the test of the user link detects a problem with the link, a service request can be generated to service the user link. However, if the test indicates that the user link is operative, the passive optical network controller 113 can decide that the user optical network terminal is not operating properly, therefore, it can generate a request to reset the terminal. If the problem is not resolved, the passive optical network controller 113 can generate a service request to send a technician to the user premise.

Although few exemplary processes have been described, it is contemplated that other services can be provided efficiently and with cost saving and higher quality of service by integrating one or more fiber switches in passive optical networks.

Figure 2:
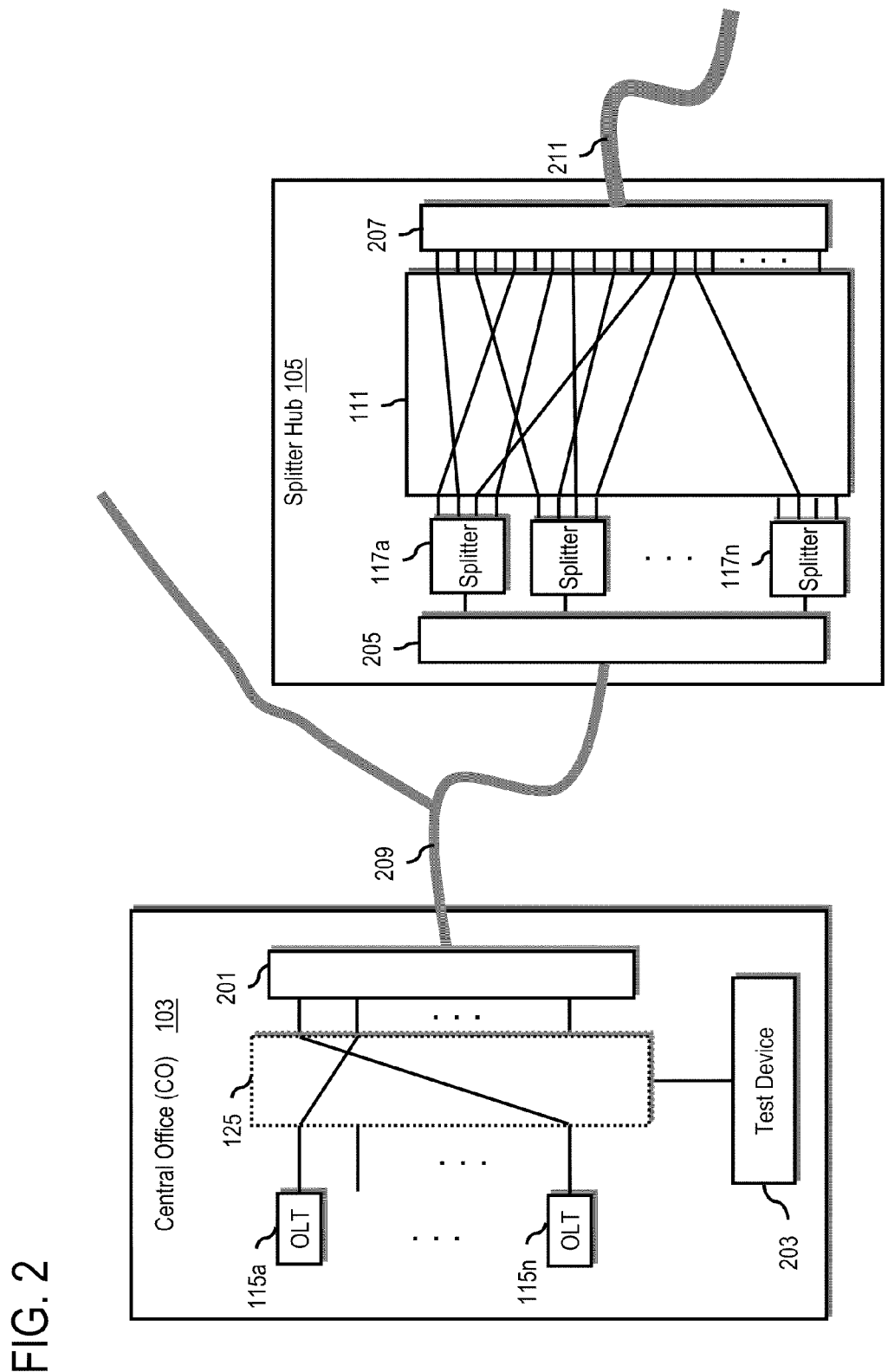
FIG. 2 a diagram of components of a central office and a passive splitter hub, according to an exemplary embodiment.

FIG. 2 is a diagram of components of central office 103 and splitter hub 105 of FIG. 1, according to an exemplary embodiment. As discussed, a passive optical network can include one or more central offices, such as central office 103, and one or more splitter hubs, such as splitter hub 105. By way of example, FIG. 2 illustrates that the central office 103 is connected to the splitter hub 105 through a feeder cable 209. Also, a distribution cable 211, out of the splitter hub 105, distributes optical signals from the splitter hub 105 to user premises.

The central office 103 can include one or more optical line terminals 115a-115n, an optional fiber switch 125, a connector 201, and a test device 203. Further, the splitter hub 105 can include connectors 205 and 207, one or more passive splitters 117a-117n, and a fiber switch 111.

As an example, the optical line terminal 115a serves as an originating point for the passive optical network 101 of system 100 to provide voice, data, video, etc. services to users and can include passive optical network cards, CPU, gateway router cards, voice gateway cards, etc. The optical line terminal 115a can transmit optical signals destined for one or more users to their premises through the splitter hub 105. Also, the optical line terminal 115a is capable of receiving optical signals from the users. In this example, the connector 201 is configured to connect output cables of the optical line terminals 115a-115n (or output ports of the switch 125) to the feeder cable 209.

The optional fiber switch 125 connects the optical line terminals 115a-115n to the connector 201 and can perform switching tasks in a variety of services provided by the passive optical network 101. In one exemplary embodiment, the fiber switch 125 can include an optical switch enabling signals in optical fibers to be selectively switched from one fiber to another. The optical switch can be implemented using different technologies such as microelectromechanical systems (MEMS), piezoelectric, nonlinear methods, thermal method, liquid crystals, with or without mirrors, lenses, and/or collimators, mechanical means, electro-optic effects, magneto-optic effects, etc. Since the central office 103 can be electrically powered, the fiber switch 125 can include ordinary power sources. Additionally or alternatively, alternative power sources, such as solar panels, can be used to provide the optical switch the necessary power.

To perform the switching tasks, the fiber switch 125 can be controlled by the passive optical network controller 113 of system 100. As noted, the passive optical network controller 113 can be implemented in the central office 103. The passive optical network controller 113 can be located remotely from the central office 103 and can communicate with the central office 103 through the service provider network 121 of system 100. In this case, the central office 103 and/or the fiber switch 125 can include a communication device or a communication interface to communicate with the passive optical network controller 113 over the service provider network 121 of system 100.

Further, the central office 103 can include the test device 203 configured to perform test and analysis of the passive optical network 101 of system 100. Services provided by the test device 203 can include testing end-to-end loss, continuity, power (a measure if the system is operating properly), etc. The test device 203 can include, for example, a source meter, a power meter, an optical loss test kit, a fiber tracer, a visual fault locator, an optical time-domain reflectometer (OTDR), etc. Integration of the optional fiber switch 125 in the central office 103 and the fiber switch 111 in the splitter hub provides a variety of services with greater accuracy, more efficiency, and higher quality of service. As mentioned before, one example of services that can be performed remotely and automatically by implementing the fiber switches is performing different tests on the network using the test device 203.

Another example of improvements in efficiency and quality of service by implementing the optional fiber switch 125 can include automatic and remote trouble shooting of the optical line terminals 115a-115n. If it is detected that one (or more) of the optical line terminals is experiencing any problem, the fiber switch 125, based on a command signal from the passive optical network controller 113, can switch from the troubled optical line terminal to a backup optical line terminal to minimize any service disruption to the users served by the troubled optical line terminal.

As mentioned, the passive optical network 101 of system 100 has a point to multipoint structure. Each optical line terminal, such as optical line terminal 115a, transmits optical signals that are destined to one or more users. The optical signals are transmitted to passive splitters, such as splitters 117a-117n, through the feeder cable 209, to be distributed to the users. The passive splitters 117a-117n can be located in the splitter hub 105. The splitter hub 105 connects the feeder cable 209 to the distribution cable 211 via connectors 205 and 207, splitters 117a-117n, and the fiber switch 111. The connector 205 can be used to connect the feeder cable 209 to input ports of the splitters 117a-117n. The connector 207 is capable of connecting the distribution cable 211 to output ports of the fiber switch 111. The fiber switch 111 connects the splitters 117a-117n to the connector 207.

In an exemplary embodiment, the splitter hub 105 is unpowered, located close to user premises, and can face harsh environmental conditions. The fiber switch 111, as is explained further with respect to FIG. 3, can include and/or be operatively connected to different components such as one or more optical switches, an alternative power source, and/or a communication device. Since the splitter hub 105 is designed as a passive hub, the alternative power source provides necessary electrical power for the optical switch and/or the communication device. In one example, the alternative power source can be a standalone power source—e.g., implemented and integrated independently from any power grid and/or power facility. The communication device is configured to communicate with the passive optical network controller 113 of system 100 over, for example, a signaling channel. The passive optical network controller 113 communicates command signals to the optical switch for switching tasks. The integration of the fiber switches (such as fiber switches 111 and 125) in the passive optical network 101 of system 100 provides variety of services such as automatic connection/disconnection re-configuration, proactive fiber link testing, and automatic optical line terminal (OLT) and/or optical network terminal (ONT) trouble shooting. These exemplary processes are more fully described below with respect to FIGS. 5-8.

Figure 3:
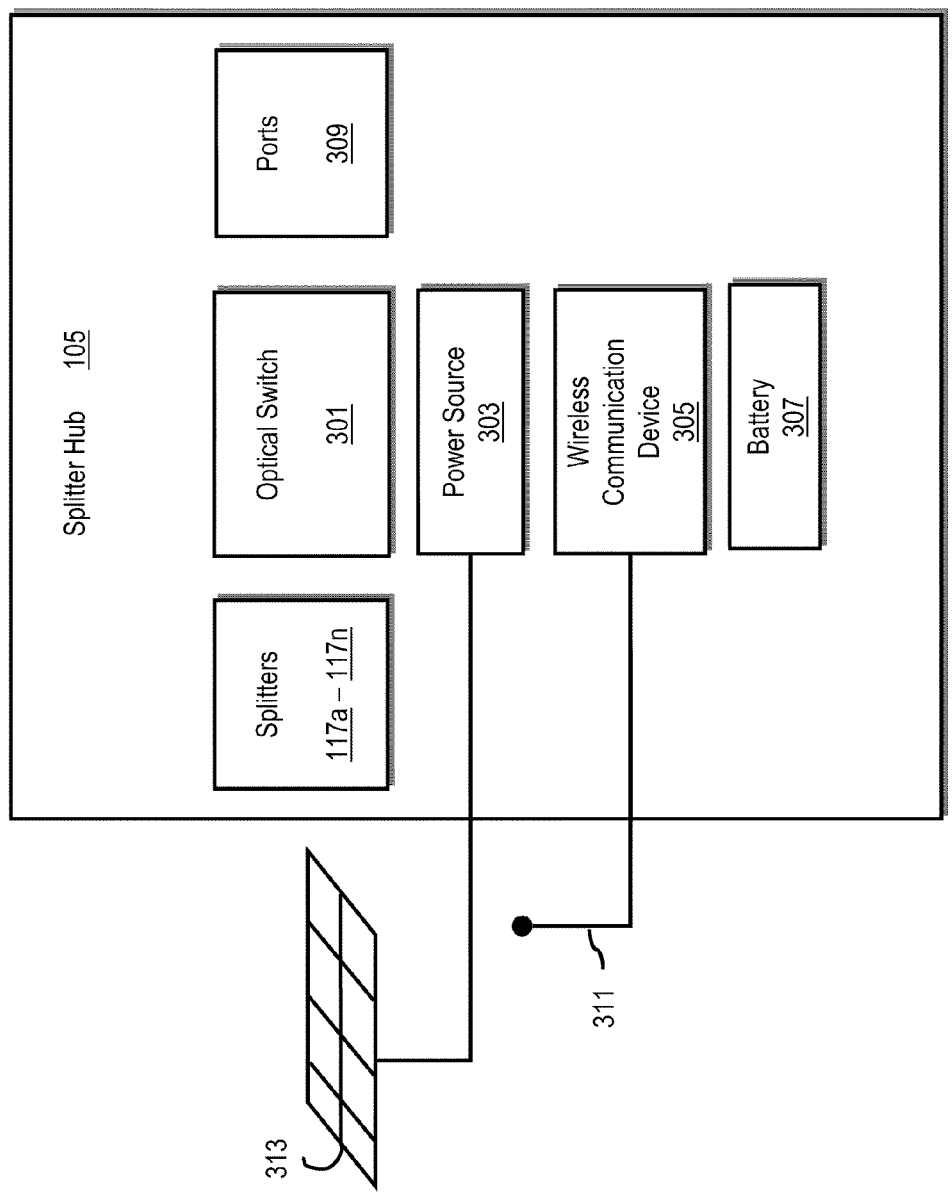
FIG. 3 is a diagram of components of a passive splitter hub, according to an exemplary embodiment.

FIG. 3 is a diagram of components of the passive splitter hub 105 of FIG. 1, according to an exemplary embodiment.

For the illustration purposes, the splitter hub 105 can include optical switch 301 (which can be same and/or part of the fiber switch 111 of system 100), power source 303, wireless communication device 305, battery 307, ports 309, passive splitter 117a-117n, and antenna 311. Because the splitter hub 105 may need to be deployed within environmental harsh conditions, the optical switch 301 is likewise "hardened" to tolerate extreme weather conditions such as temperature, humidity, etc., according to certain embodiments.

As noted, the switch matrix of the optical switch 301 can be configured with N×N, 1×N, and/or N×M ports and can enable signals in optical fibers connected to it to be selectively switched from one fiber to another. The amount of electrical power consumed by the optical switch 301 depends on its technology. In one embodiment, the optical switch 301 is designed and implemented to consume very low electrical power during the switching.

In an exemplary embodiment, since the optical switch 301 is integrated in a passive and unpowered splitter hub 105, one or more alternative sources of power are integrated. In the exemplary embodiment of FIG. 3, the power source 303 can be a standalone power source—e.g., implemented and integrated independently from any power grid and/or power facility. For instance, the power source 303 can include solar cells or panels 313 to convert light energy to electricity to power the optical switch 301 and/or the wireless communication device 305. However, it is contemplated that other power sources can also be used. In this exemplary embodiment, the power source 303 can be operatively connected to the optical switch 301 and/or the wireless communication device 305 to provide necessary electrical power. Also, the power source 303 can be operatively connected to the battery 307 to charge the battery. The battery 307 can also be connected to the optical switch 301 and/or the wireless communication device 305 to provide electrical power, if needed.

Switching tasks performed by the optical switch 301 can be controlled by the passive optical network controller 113 of system 100. The passive optical network controller 113 transmits command/control signals to the optical switch 301 through a signaling channel. In one embodiment, the wireless communication device 305 (along with antenna 311) is configured to communicate with the passive optical network controller 113, for instance, through the communication network 123 of system 100. The wireless communication device 305, which can include, but is not limited to, devices such as wireless local area network card, WiFi card, WiMAX card, etc., is operatively connected to the optical switch 301 to provide the switch with command signals from the passive optical network controller 113. Although FIG. 3 includes a wireless communication device, however, it is contemplated that other communication devices can be used. In one exemplary embodiment, command/control signals from the passive optical network controller 113 can be transmitted to the optical switch 301 using optical signals and through optical fiber. In this example, the splitter hub 105 can include one or more optical terminals to convert optical command/control signals to electrical signals to control switching tasks of the optical switch 301.

As noted, the splitter hub 105 can include one or more passive splitters 117a-117n and ports 309. In one embodiment, the passive splitters 117a-117n are coupled to the feeder cable 209 of FIG. 2, for example, through the connector 205 of FIG. 2. Additionally, a portion of the ports 309 can be coupled to the distribution cable 211 of FIG. 2 serving the optical network terminals 107a-107n of FIG. 1. In this embodiment, the optical switch 301 is configured to be coupled to the splitters 117a-117n and the ports 309 to enable signals in optical fibers connected to it to be selectively switched from one fiber to another.

Figure 4:
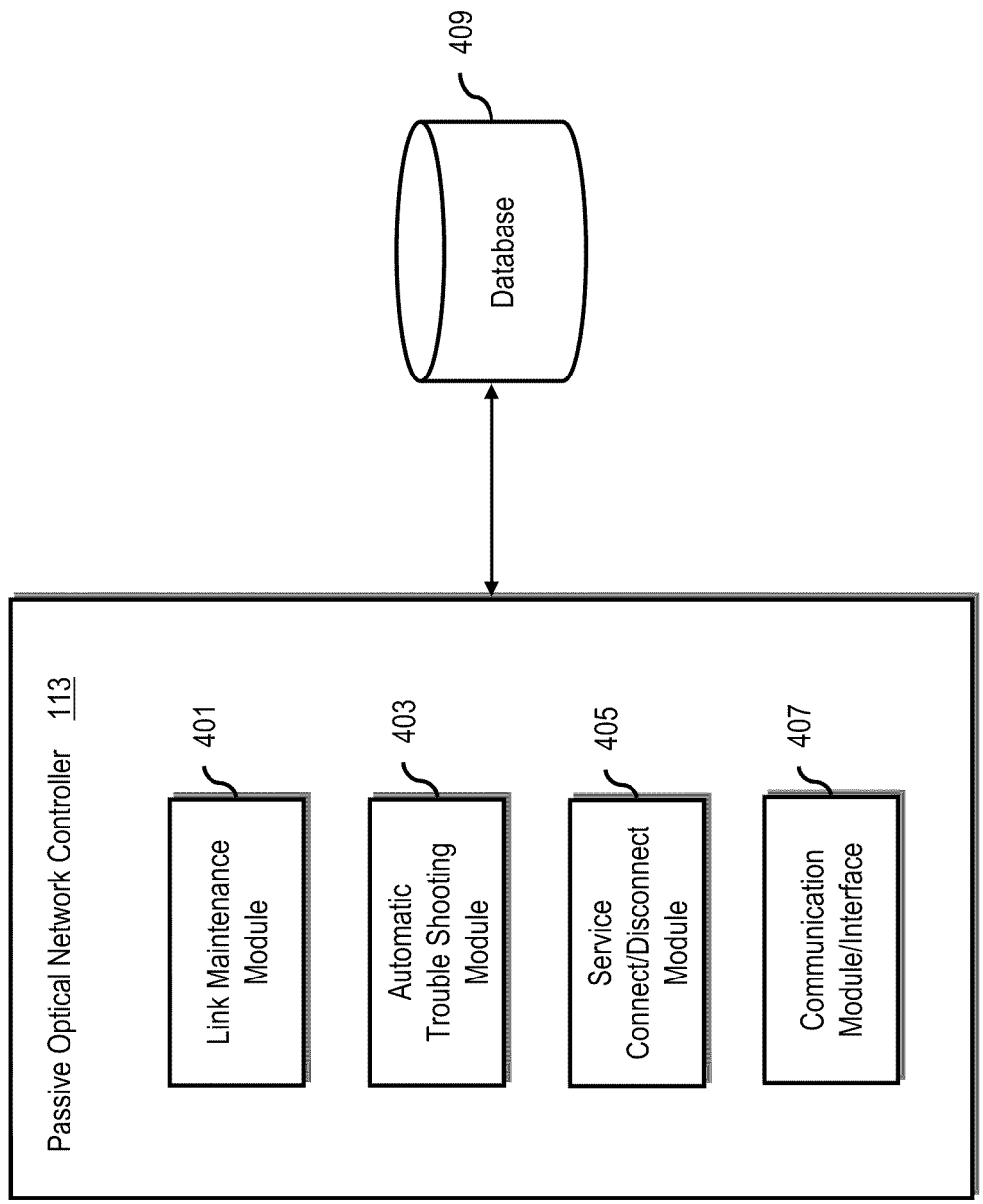
FIG. 4 is a diagram of components of a passive optical network controller, according to an exemplary embodiment.

FIG. 4 is a diagram of components of a passive optical network controller 113, according to an exemplary embodiment. For the purpose of illustration, the passive optical network controller 113 can include link maintenance module 401, automatic trouble shooting module 403, service connect/disconnect module 405, and communication module/interface 407. The passive optical network controller 113 can be operatively connected to a database 409. The passive optical network controller 113 along with integration of fiber switches can provide variety of services such as automatic connection/disconnection re-configuration, proactive fiber link testing, and automatic optical line terminal (OLT) and/or optical network terminal (ONT) trouble shooting. However, it is contemplated that services provided by the passive optical network controller 113 are not limited to these examples.

In one example, the link maintenance module 401 is configured to pro-actively test fiber between the central office 103 of FIG. 1 and the user premises 109a-109n. For example, the link maintenance module 401 can receive an indication that a customer is not using its service. This indication can trigger a link test. The link maintenance module 401 can generate and transmit, for example using communication module/interface 407, command signals to the fiber switches 125 and 111 and the test device 203 of FIG. 2 to initiate the test. In one embodiment, a command signal to the fiber switch 125 instructs the switch to connect a test signal of the test device 203 to a test port that is associated with the splitter of the customer. Also, a command signal to the fiber switch 111 can instruct the switch to connect a drop port of the customer to a test port of the splitter. The link maintenance module 401 instructs the test device 203 to initiate the test. Test results can be transmitted to the link maintenance module 401 for further analysis. If the test results indicate that the link is not properly operating, a service request can be generated for the customer link.

In another exemplary embodiment, the automatic trouble shooting module 403 is configured to automatically detect problems with optical line terminals and/or optical network terminals and switch to backup terminals to minimize any service disruption to users. In one example, the automatic trouble shooting module 403 receives an indication that an optical line terminal, such as optical line terminals 115a-115n, is not operating properly. In response, the automatic trouble shooting module 403 generates a command signal and communicates the command signal to the fiber switch 125 using, for example, communication module/interface 407. The generated command signal can instruct the fiber switch 125 to switch from the troubled optical line terminal to a backup optical line terminal.

In another example, the automatic trouble shooting module 403 can receive an indication that a user optical network terminal, such as optical network terminals 109a-109n, may not be operating accurately. In this case, the automatic trouble shooting module 403 can initiate a request to the link maintenance module 401 to perform a test on the user link to detect if the problem is with the user link or the optical network terminal. If the user link is experiencing difficulties, a service request can be generated for the user link. However, if the user link is acceptable, the automatic trouble shooting module 403 can initiate a communication session with the user to instruct the user to reset the troubled optical network terminal. In the case the problem is not resolved; a service request for the troubled optical network terminal is generated.

According to another exemplary embodiment, the service connect/disconnect module 405 is configured to perform, remotely and automatically, connection and/or disconnection reconfiguration. For example, the service connect/disconnect module 405 receives an indication that a new customer requested service connection from the service provider. In response, the service connect/disconnect module 405 can generate and transmit a command signal to the fiber switch 111 to instruct the switch to connect the port of the new customer to an available splitter port. Additionally, the service connect/disconnect module 405 can receive an indication that an existing customer requested to discontinue service. In this case, the service connect/disconnect module 405 generates a command signal for service disconnect. The command signal is transmitted, for example using the communication module/interface 407, to the fiber switch 111 to instruct the switch to disconnect the port of the splitter associated with the user from the user port.

The passive optical network controller 113 can be operatively connected to a database 409. The database 409 can include, in addition to other data, information regarding the topology of the passive optical network and how the optical line terminals, the splitters, the fiber switches, the optical network terminals, fiber optics, etc. are connected to each other. The passive optical network controller 113 can use this information to support the exemplary services discussed above.

Figure 5:
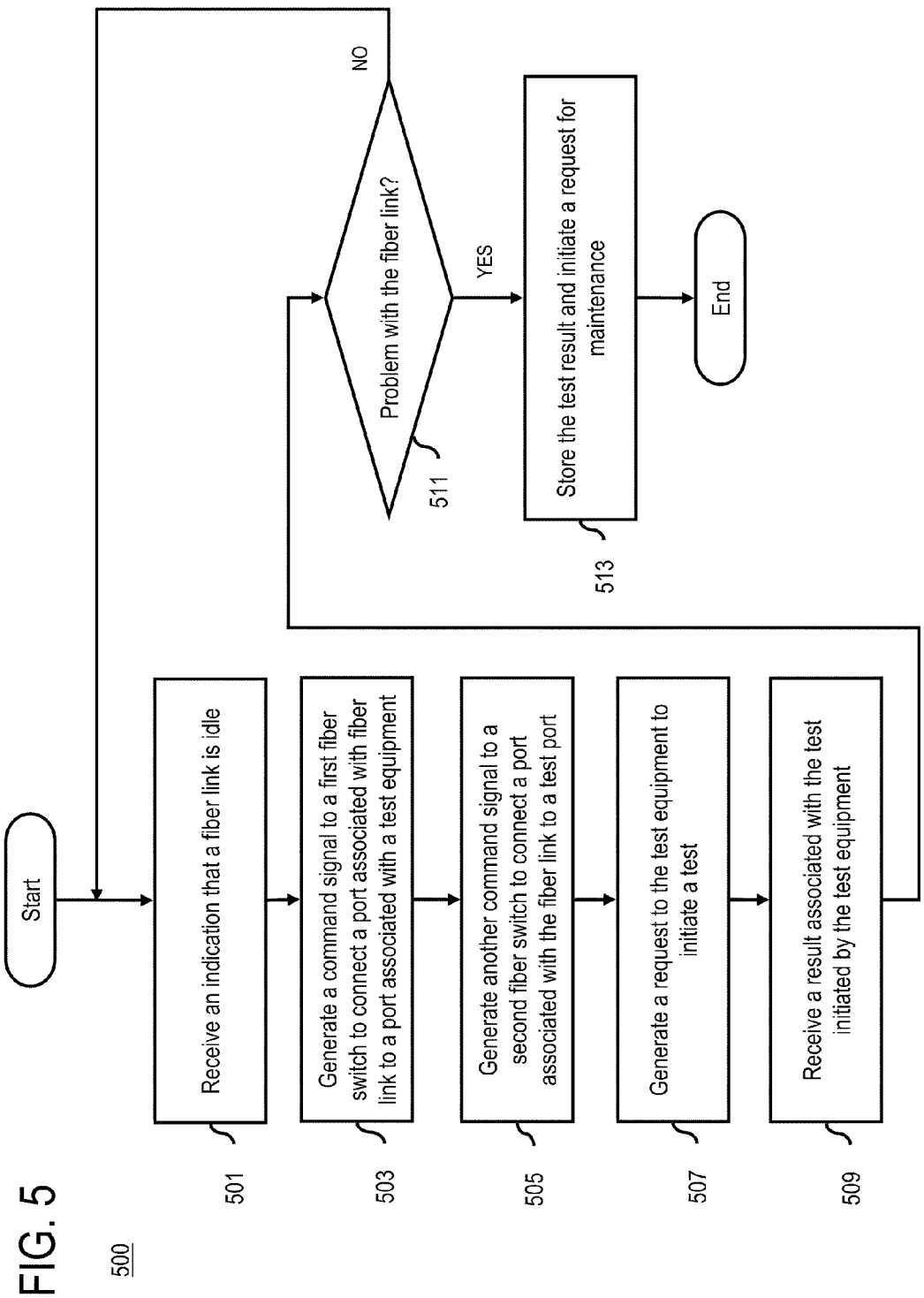
FIG. 5 is a flowchart of a process for proactive fiber link testing, according to an exemplary embodiment.

FIG. 5 is a flowchart of a process for pro-active fiber link testing, according to an exemplary embodiment. In one embodiment, process 500 can be performed at link maintenance module 401 of FIG. 4. At step 501, an indication is received that a fiber link associated to a customer is idle. This indication can specify that the customer is not using the service at the moment. At step 503, a command signal is generated to be transmitted to a first fiber switch. The first fiber switch can include the fiber switch 125 of FIG. 2 located at the central office 103. In one example, the command signal instructs the first fiber switch to connect a port associated with a test equipment (such as the test device 203 of FIG. 2) to a port associated with the passive splitter serving the customer.

At step 505, another command signal can be generated to be transmitted to a second fiber switch. The second fiber switch can include the fiber switch 111 located at the splitter hub 105 of FIG. 2. This command signal instructs the second fiber switch to connect a test port associated with the splitter to a port associated with the user. At step 507, a request to the test equipment, such as the test device 203, can be generated to initiate a test for the link.

At step 509, the result of the test initiated by the test equipment is received. At step 511, a determination is made, based on the test result, if the customer link is experiencing any difficulties. If a problem with the customer link is detected, at step 513, the test results are stored, for example at database 409, and a service request is initiated.

Figure 6:
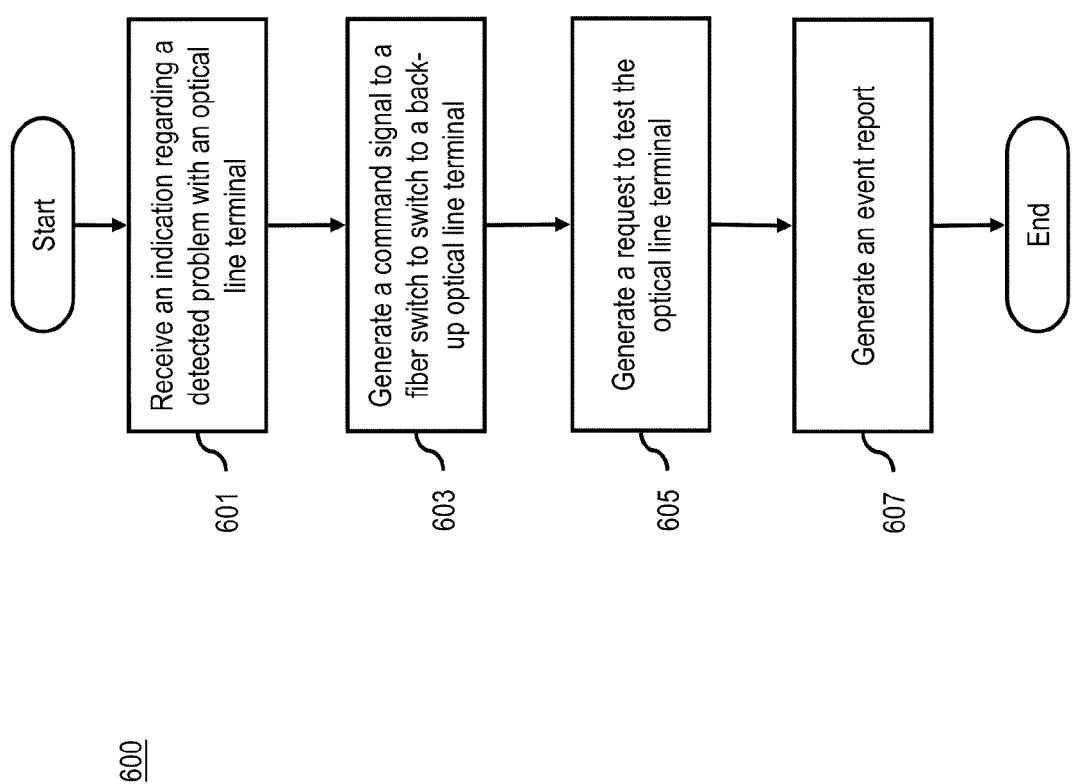
FIG. 6 is a flowchart of a process for automatic optical line terminal trouble shooting, according to an exemplary embodiment.

FIG. 6 is a flowchart of a process for automatic optical line terminal trouble shooting, according to one exemplary embodiment. In one embodiment, process 600 can be performed at automatic trouble shooting module 403 of FIG. 4. At step 601, the process 600 receives an indication that an optical line terminal, such as optical line terminals 115a-115n of FIG. 2, is not operating properly. At step 603, a command signal is generated to be communicated to a fiber switch, such as fiber switch 125 located at central office 103 of FIG. 2. The command signal instructs the fiber switch to disconnect the troubled optical line terminal and connect a backup optical line terminal. At step 605, a service request to test the troubled optical line terminal is generated. At step 607, an event report is generated. Process 600 can detect and replace troubled optical line terminals with minimum service disruption to customers.

Figure 7:
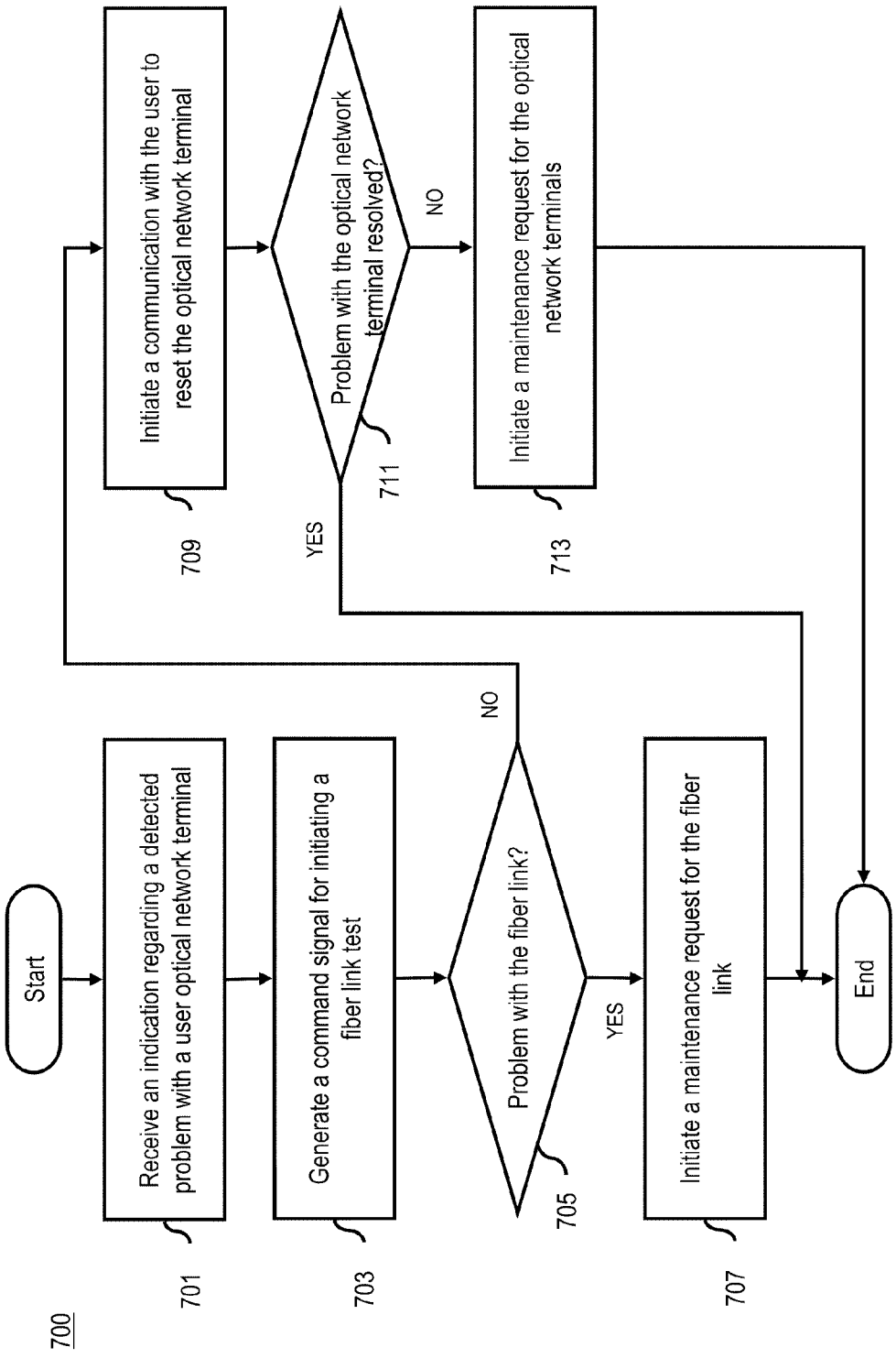
FIG. 7 is a flowchart of a process for automatic optical network terminal trouble shooting, according to an exemplary embodiment.

FIG. 7 is a flowchart of a process for automatic optical network terminal trouble shooting, according to an exemplary embodiment. In one example, process 700 can be performed at the automatic trouble shooting module 403 of FIG. 4. At step 701, an indication is received that an optical network terminal associated with a customer, such as optical network terminals 107a-107n of FIG. 1, is not operating properly. At step 703, a command signal is generated to initiate a test for user link. In one example, the link test can be performed based on process 500 of FIG. 5.

At step 705, it is determined whether the detected problem is a result of user link failure. If it is detected that the user link experiences difficulties, at step 707, a maintenance request is initiated to service the link. However, if no problem is detected at the user link, at step 709, communication with the user associated with the troubled optical network terminal is initiated and reset of the terminal is requested. At step 711, it is determined whether the problem with the optical network terminal is resolved. If the problem is not resolved, at step 713, a maintenance request for the troubled optical network terminal is initiated.

Figure 8B:
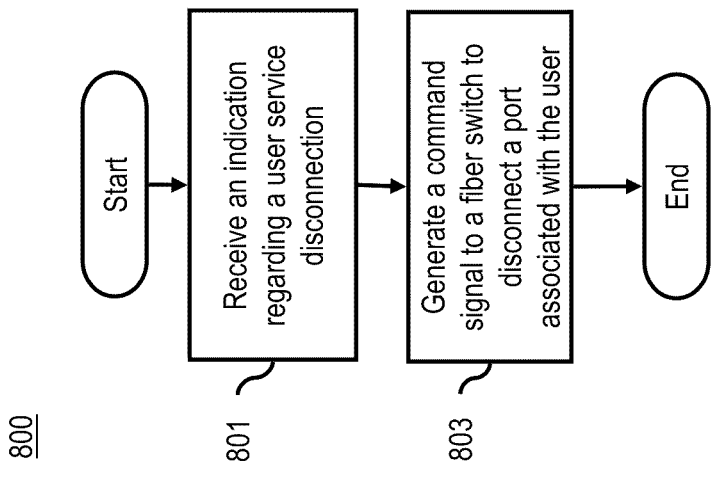
FIGS. 8A and 8B are flowcharts of processes for remote and automatic service connection/disconnection re-configuration, according to various exemplary embodiments.
Figure 8A:
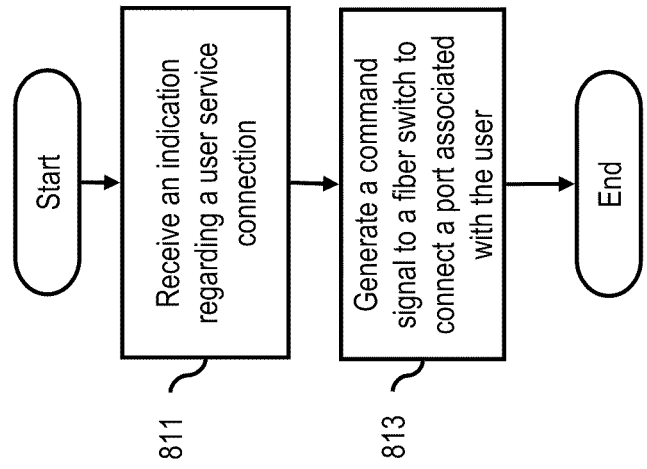

FIGS. 8A and 8B are flowcharts of processes for remote and automatic service connection/disconnection re-configuration, according to various exemplary embodiments. Processes 800 and 810 can be performed at service connect/disconnect module 405 of FIG. 4. In process 800, at step 801, an indication is received that a customer requested service disconnection. At step 803, a command signal is generated to be communicated to a fiber switch, such as fiber switch 111 located at the splitter hub 105 of FIG. 2. The command signal can instruct the fiber switch to disconnect a port associated with the customer from a splitter of the splitter hub 105.

In process 810, at step 811, an indication is received that a new customer requested service connection. At step 813, a command signal is generated to be communicated to the fiber switch, for example, the fiber switch 111, to connect a port associated with the new customer to a splitter of the hub 105.

The described implementations and processes, according to certain embodiments, advantageously provide a variety of services more efficiently, less costly, with greater accuracy and higher quality of service by, for example, reducing the need to dispatch technicians, detecting potential problems with the network early on, performing services automatically and remotely, etc.

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
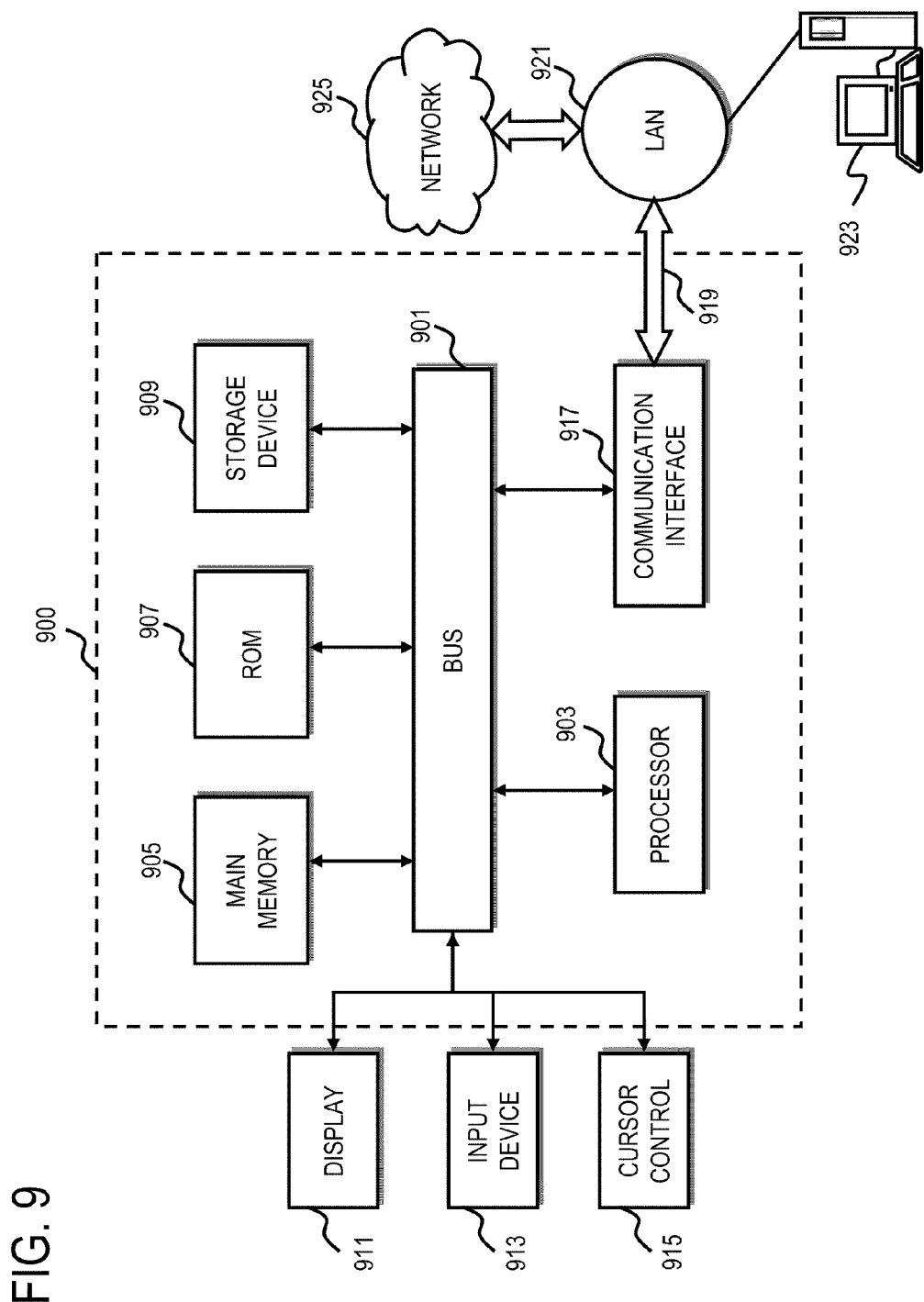
FIG. 9 is a diagram of a computer system that can be used to implement various exemplary embodiments.

FIG. 9 illustrates computing hardware (e.g., computer system) upon which an embodiment according to the invention can be implemented. The computer system 900 includes a bus 901 or other communication mechanism for communicating information and a processor 903 coupled to the bus 901 for processing information. The computer system 900 also includes main memory 905, such as random access memory (RAM) or other dynamic storage device, coupled to the bus 901 for storing information and instructions to be executed by the processor 903. Main memory 905 also can be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to an embodiment of the invention, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the embodiment of the invention. Thus, embodiments of the invention are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g. for Ethernet™ or an Asynchronous Transfer Model (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an embodiment of the invention through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
generating a command signal to control a splitter hub of a passive optical network, the splitter hub being proximate a user premises and configured to communicate with a plurality of optical network terminals that respectively serve a plurality of customer premises,
wherein the splitter hub includes a fiber switch configured to provide switching between one of a plurality of input ports and one of a plurality of output ports of the splitter hub in response to the command signal,
wherein the splitter hub further includes a plurality of passive splitters coupled between (i) a feeder cable connected to a central office, and (ii) the fiber switch, and
wherein each user premise includes a fiber link associated with one of the plurality of passive splitters,
the method further comprising:
generating another command signal to another fiber switch within a central office to initiate testing of a certain fiber link coupled to the splitter hub, wherein
the other command signal includes directing a test device to connect to a test port connected to the passive splitter associated with the certain fiber link.

2. A method of claim 1, wherein the fiber switch is coupled to a standalone power source.

3. A method of claim 2, wherein the standalone power source includes solar cells.

4. A method of claim 1, further comprising:
receiving a request to disable a connection with one of the optical network terminals, wherein the command signal instructs the fiber switch of the splitter hub to disable the connection.

5. An apparatus comprising:
a processor configured to generate a command signal to control a splitter hub of a passive optical network, the splitter hub being proximate a user premises and configured to communicate with a plurality of optical network terminals that respectively serve a plurality of customer premises,
wherein the splitter hub includes a fiber switch configured to provide switching between one of a plurality of input ports and one of a plurality of output ports of the splitter hub in response to the command signal,
wherein the splitter hub further includes a plurality of passive splitters coupled between (i) a feeder cable connected to a central office, and (ii) the fiber switch, and
wherein each user premise includes a fiber link associated with one of the plurality of passive splitters, and
the processor further configured to generate another command signal to another fiber switch within a central office to initiate testing of a certain fiber link coupled to the splitter hub, wherein
the other command signal includes directing a test device to connect to a test port connected to the passive splitter associated with the certain fiber link.

6. An apparatus of claim 5, wherein the fiber switch is coupled to a standalone power source.

7. An apparatus of claim 6, wherein the standalone power source includes solar cells.

8. An apparatus of claim 5, further comprising:
a communication interface configured to receive a request to disable a connection with one of the optical network terminals, wherein the command signal instructs the fiber switch of the splitter hub to disable the connection.

9. A method comprising:
receiving a command signal, at a splitter hub of a passive optical network, to control the splitter hub, the splitter hub being proximate a user premises and configured to communicate with a plurality of optical network terminals that respectively serve a plurality of customer premises,
wherein the splitter hub includes a fiber switch configured to provide switching between one of a plurality of input ports and one of a plurality of output ports of the splitter hub in response to the command signal,
wherein the splitter hub further includes a plurality of passive splitters coupled between (i) a feeder cable connected to a central office, and (ii) the fiber switch, and
wherein each user premise includes a fiber link associated with one of the plurality of passive splitters,
the method further comprising:
receiving another command signal at another fiber switch within a central office of the passive optical network, to initiate testing of a certain fiber link coupled to the splitter hub, wherein
the other command signal includes directing a test device to connect to a test port connected to the passive splitter associated with the certain fiber link.

10. A method of claim 9, wherein the fiber switch is coupled to a standalone power source.

11. A method of claim 10, wherein the standalone power source includes a solar power source.

12. A method of claim 9, further comprising:
in response to the command signal, disabling a connection, via the fiber switch of the splitter hub, with one of the optical network terminals.

13. A method of claim 9, further comprising:
initiating, at the splitter hub, wireless communication with a controller configured to generate the command signal.

14. A system comprising:
a splitter hub; and
a central office,
the splitter hub including:
a plurality of passive splitters;
a plurality of ports, wherein a portion of the ports coupled to a plurality of optical network terminals that respectively serve a plurality of customer premises, wherein each customer premise includes a fiber link associated with one of the plurality of passive splitters;
an optical switch coupled to the ports, the plurality of passive splitters being coupled between (i) a feeder cable connected to the central office, and (ii) the optical switch;
a battery configured to provide power to the optical switch;
a standalone power source coupled to the battery, wherein the standalone power source includes solar cells; and
a wireless communication device coupled to the optical switch,
wherein the optical switch is configured to receive a command signal to control the splitter hub apparatus of the passive optical network, the splitter hub apparatus being configured to communicate with the plurality of optical network terminals that respectively serve the plurality of customer premises,.
the central office including:
another optical switch; and
a test device,
wherein the central office is configured to receive generate another command signal to initiate testing of a certain fiber link coupled to the splitter hub, wherein
the other command signal includes directing the test device to connect to a test port connected to the passive splitter associated with the certain fiber link.

* * * * *